INVENTOR.
JOHN G. SOAVE

Feb. 14, 1956 J. G. SOAVE 2,734,604
AUTOMATIC CONTROL MECHANISMS FOR MACHINES
WITH INTERDEPENDENTLY OPERATING PARTS
Filed Dec. 31, 1954 9 Sheets-Sheet 3

INVENTOR.
JOHN G. SOAVE
BY
ATTORNEY

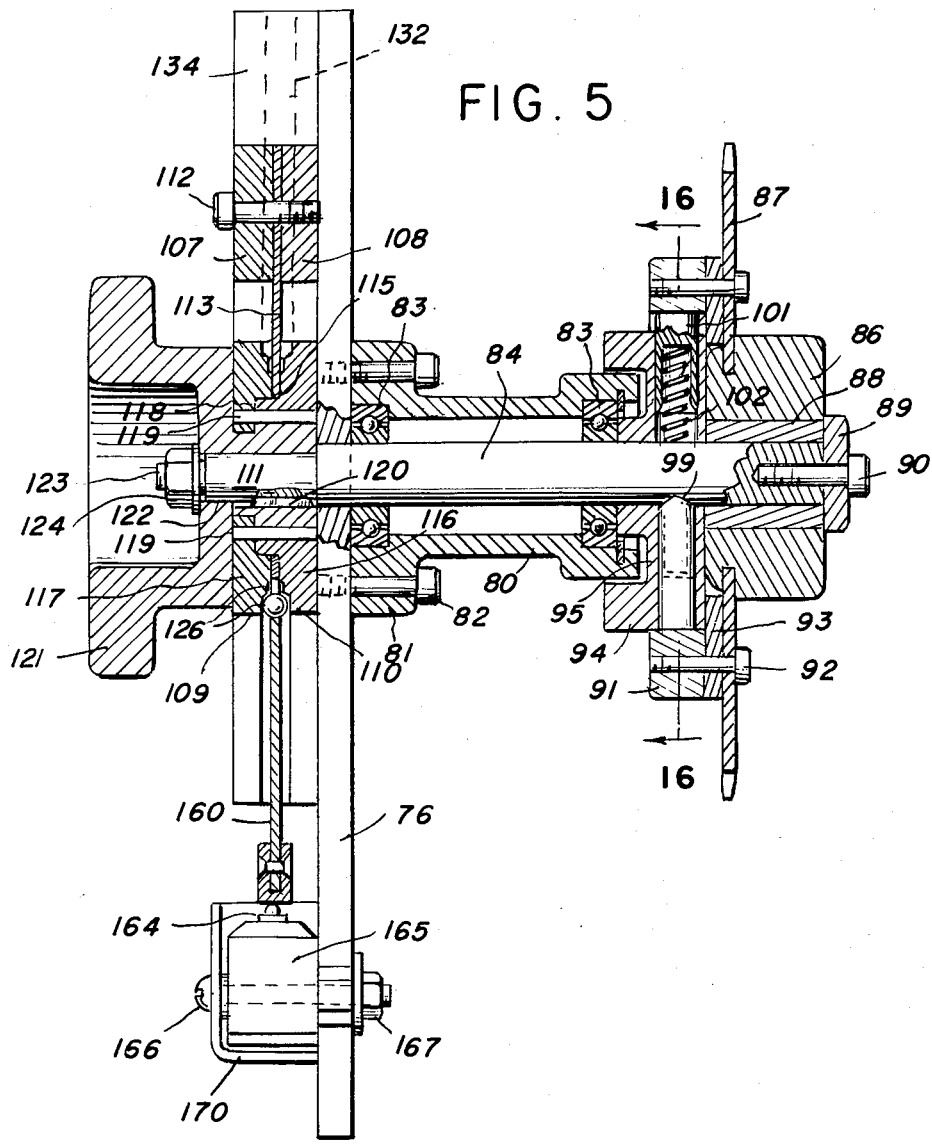

Feb. 14, 1956  J. G. SOAVE  2,734,604
AUTOMATIC CONTROL MECHANISMS FOR MACHINES
WITH INTERDEPENDENTLY OPERATING PARTS
Filed Dec. 31, 1954  9 Sheets-Sheet 5
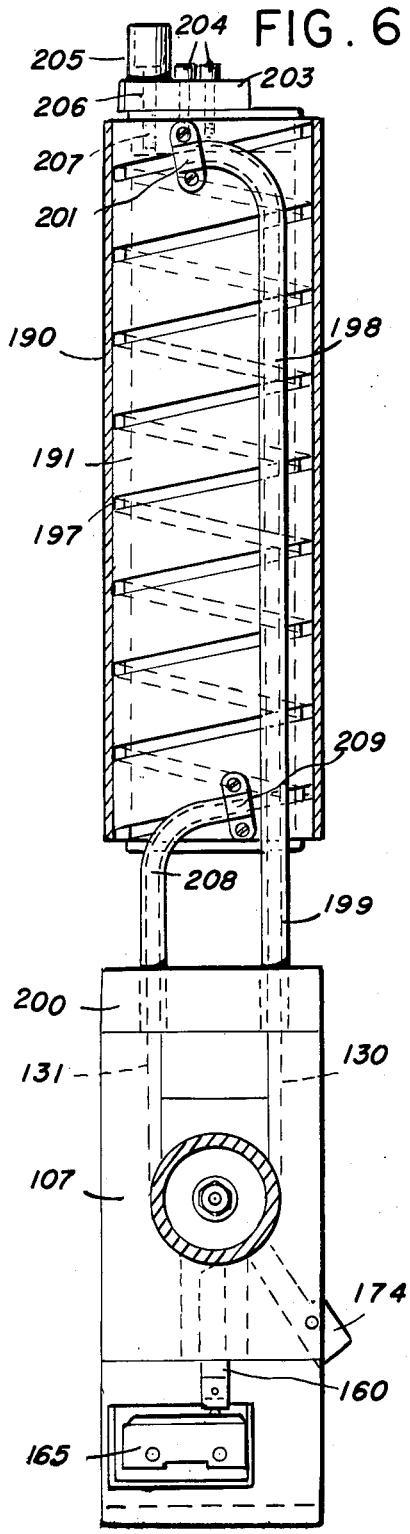
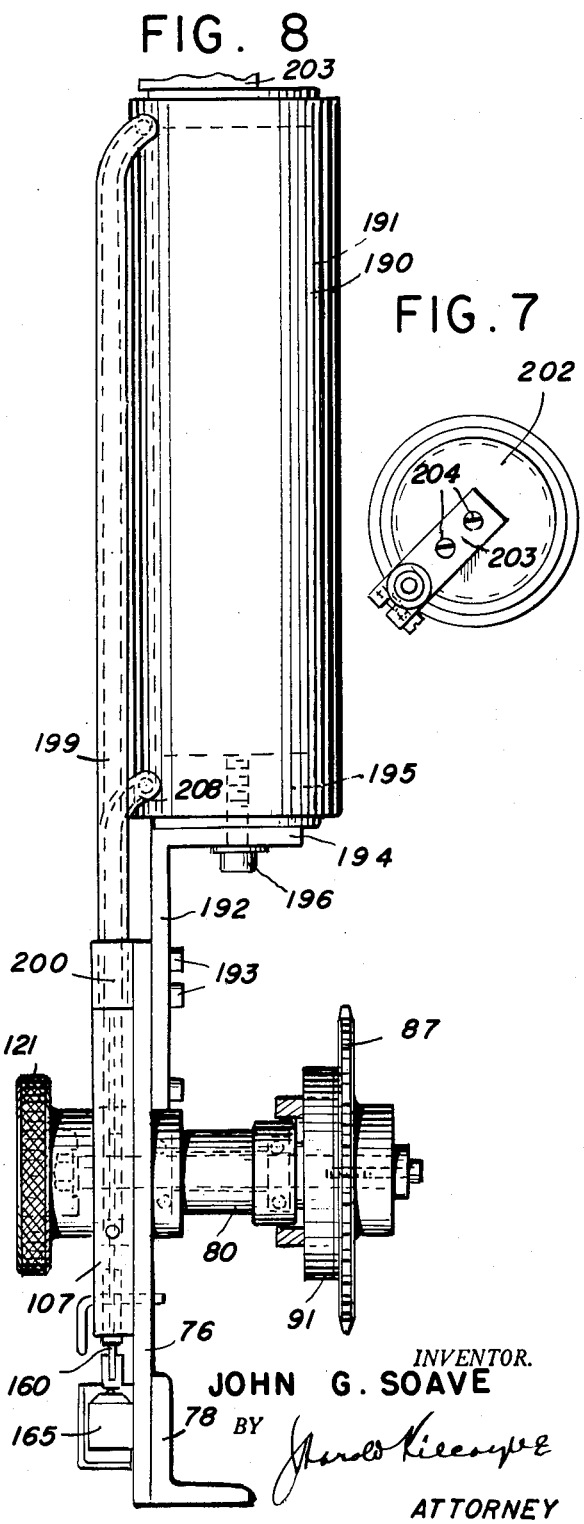
INVENTOR.
JOHN G. SOAVE
BY
ATTORNEY Feb. 14, 1956     J. G. SOAVE     2,734,604
AUTOMATIC CONTROL MECHANISMS FOR MACHINES
WITH INTERDEPENDENTLY OPERATING PARTS
Filed Dec. 31, 1954     9 Sheets-Sheet 6

INVENTOR.
JOHN G. SOAVE
BY

Feb. 14, 1956 J. G. SOAVE 2,734,604
AUTOMATIC CONTROL MECHANISMS FOR MACHINES
WITH INTERDEPENDENTLY OPERATING PARTS
Filed Dec. 31, 1954 9 Sheets-Sheet 7

INVENTOR.
JOHN G. SOAVE
BY
ATTORNEY

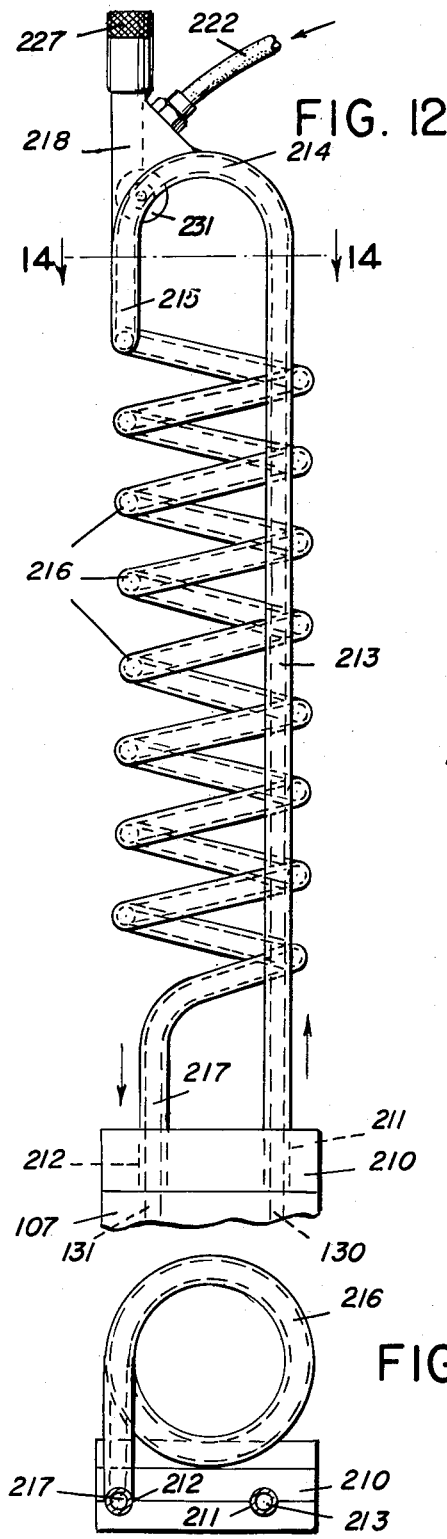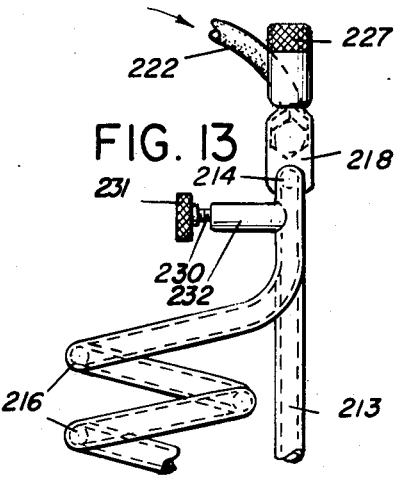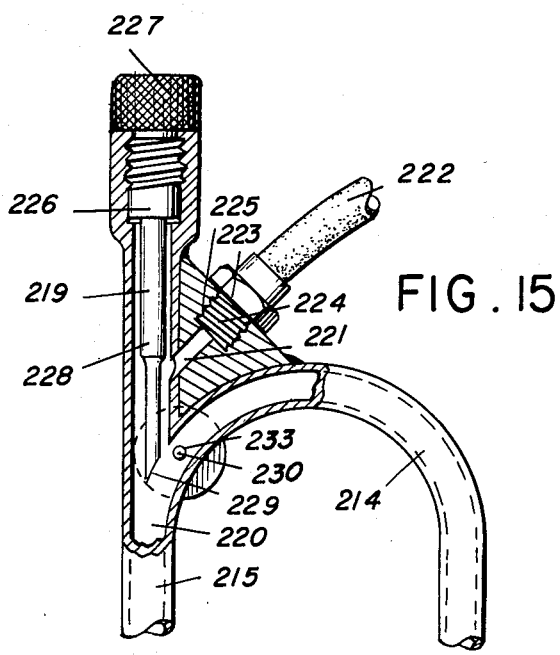

Feb. 14, 1956 J. G. SOAVE 2,734,604
AUTOMATIC CONTROL MECHANISMS FOR MACHINES
WITH INTERDEPENDENTLY OPERATING PARTS
Filed Dec. 31, 1954 9 Sheets-Sheet 9
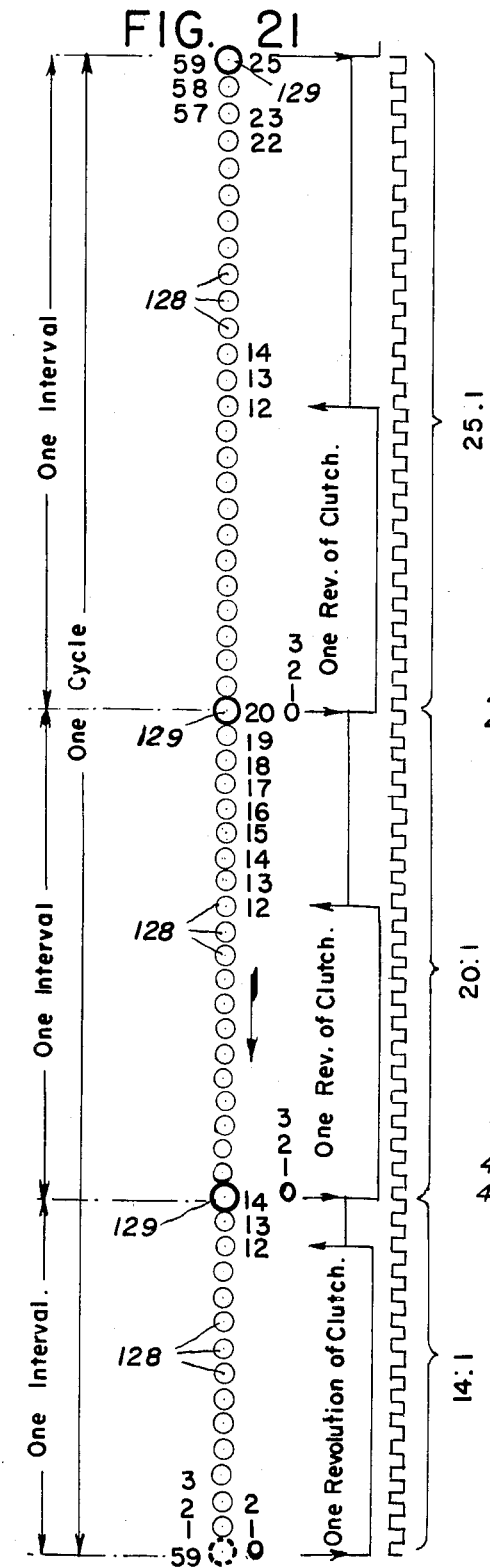
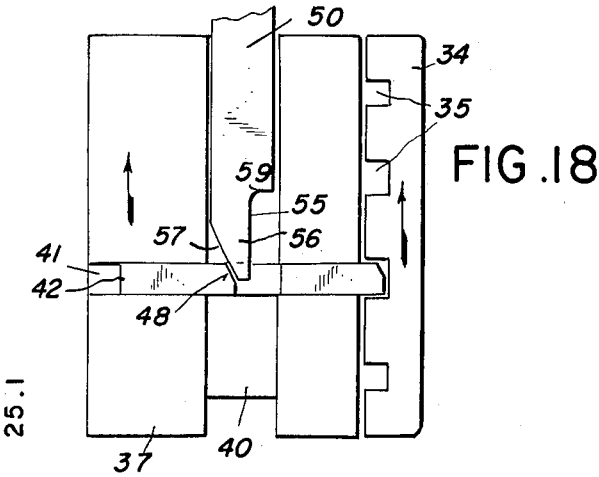
FIG. 18
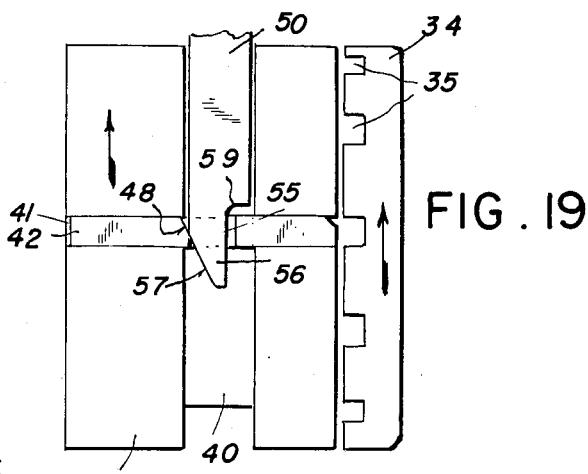
FIG. 19
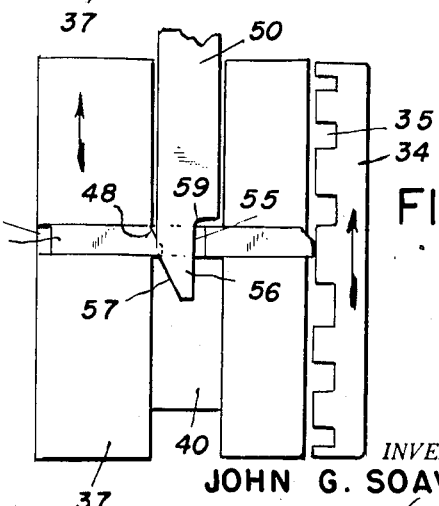
FIG. 20
INVENTOR.
JOHN G. SOAVE
BY
ATTORNEY

United States Patent Office 2,734,604
Patented Feb. 14, 1956

2,734,604

AUTOMATIC CONTROL MECHANISMS FOR MACHINES WITH INTERDEPENDENTLY OPERATING PARTS

John G. Soave, Long Island City, N. Y., assignor to Waldes Kohinoor, Inc., Long Island City, N. Y., a corporation of New York Application December 31, 1954, Serial No. 479,169

13 Claims. (Cl. 192—31)

This invention relates generally to an automatic control mechanism for various pieces of machinery, and more especially to machines which are designed to execute two or more operations which are repeated cyclicly.

In various machines which are designed to perform two or more repeated cyclic operations such, for instance, as the forming of a continuous row of stitches upon fabric or the like with the simultaneous application of certain types of fastener elements along the line of stitches at spaced intervals, there is usually provided a mechanism for interrupting the application and affixing of the fastener elements while the machine is stitching the material between spaced adjacent elements. Frequently, it is desired to space the fasteners one from the other various different distances apart which requires special control mechanism for each predetermined spacing arrangement.

In present day machines, the aforesaid procedure is costly and expensive and requires a different machine arrangement for each type of spacing of fastener elements along a pathway of stitches such as to produce a product having the fastener elements thereon spaced one from the other a required predetermined distance. In addition, when changing the spacing of the repeated cycle of operations, it is necessary that the machine be out of operation for a considerable length of time during the changeover period.

Broadly stated, an object of the present invention resides in a control mechanism for a machine in which one part performs a continuous operation on an article or product, while another part performs a different operation on the same product in timed and variable relationship to the first part.

Another object is to provide an automatic control mechanism which is designed to govern the periodical engagement of the driving means of one part of the machine with the driving means of the other part such that engagement and disengagement is repeated in intervals or cycles, which intervals can be changed so that the sequence of repeated cycles can be altered to suit the conditions of machine operation.

Another object is to provide a machine in which one part is operated continuously, while another part of the machine is intermittently operated by being connected to the first part for a short period and only temporarily so that it may be stopped after it has performed a certain shorter operation, the two parts working interdependently so that one part is operated at variable intervals with relation to the other part.

Yet another object is to provide a machine having two shafts which are operated at a fixed ratio to each other with one shaft running continuously, while the other shaft is connected in driving relationship therewith temporarily at certain intervals, after which the shafts are disengaged for a predetermined time period and until a new cycle is repeated.

Another object of the invention is to provide a machine having a pair of shafts, one of which is adapted to operate a continuous portion of a machine, and the other shaft being adapted to operate another part of the machine temporarily at spaced intervals and to provide a clutch mechanism adapted to connect the shafts for rotation so that the intermittently operated shaft will rotate a predetermined angular distance to complete repeated cyclic operations.

Another object is to provide a machine as above set forth, in which the clutch mechanism for drivingly connecting the two shafts includes a pair of clutch discs arranged one on each shaft, and adapted to be drivingly connected by means of a spring loaded clutch bolt, the clutch bolt being arranged for axial sliding movement and adapted to be operated at predetermined intervals by means of a control member.

Yet another object of the invention is to provide an automatic control for the aforementioned clutch means such that the clutch will be engaged and disengaged at variable intervals, the intervals being determined and governed by a mechanism which can be changed if desired to permit clutch actuation at equal intervals or unequal intervals during the machine operation.

A further object of the invention is to provide an automatic control mechanism for causing the clutch to be engaged at predetermined intervals which includes a series of balls movable along a pathway, with certain of said balls being of increased size to actuate a control member in the pathway as the balls are circulated along said pathway at a speed proportionate to the speed of the driven shaft of the machine. Thus, the balls of increased diameter when interchanged with ones of a lesser diameter will cause the actuating mechanism to be operated at intervals depending upon the arrangement of the larger balls in said pathway.

Another object of the invention is to provide a linkage or actuating mechanism between the balls and the clutch bolt including a solenoid actuated lever which is normally held in a position to maintain the clutch bolt out of engagement with the clutch disc, such that when the solenoid is energized by one of the larger balls in said pathway engaging a microswitch button, the clutch will be energized to cause rotation of the shaft connected thereto to rotate one full revolution, after which the clutch bolt is again projected into a position of retraction to disengage the clutch parts.

Still another object of the invention resides in the provision of a series of balls in an endless channelway through which they are driven continuously by suitable drive mechanism connected to the drive shaft of the machine. Optionally, the channel can be increased in length by arranging the path along a spiral or, if desired, the spiral channelway can be removed and one of another form substituted describing an elongated loop.

Another object of the invention resides in the provision of driving and driven shafts which are rotated at different speeds, and a second driven shaft for continuously moving the series of balls along said closed pathway in synchronism with the first driven shaft.

Still another object of the invention resides in the provision of a manually operated control member for selectively positioning the balls in the ball channel in a predetermined position with respect to the micro-switch button actuator so that the repeated cycle of operations performed by the machine can be started in any desired position of the machine parts.

The above and other objects and advantages of the automatic control mechanism for the machine according to the invention will be apparent from the following detailed description thereof, reference being had to the accompanying drawings illustrating a preferred control mechanism for carrying out the invention, in which Figure 1 is a plan view of the mechanism for automatically controlling the one-revolution clutch, and showing the manner in which the control mechanism is driven from the drive shaft through suitable reduction gearing.

Figure 5 is a vertical cross-sectional view taken on line 5—5 of Figure 3 and looking in the direction of the arrows to illustrate the manner in which the rotary ball carrier is driven to cause the series of balls to travel in a circuitous pathway when the machine is in operation.

Figure 6 is a side elevational view of a modified form of the invention showing the spiral ball pathway and illustrating the manner in which the same is formed in dotted lines.

Figure 7 is a top elevational view illustrating a feed opening having a closure for supplying balls, both large and small, in proper order to the spiral ball pathway.

Figure 8 is a view similar to Figure 6, but displaced angularly 90 degrees to indicate a side edge view, and thereby show the manner in which the device of Figures 6 and 7 is supported by the automatic control mechanism.

Figure 12 is a side elevational view of another modified form of the invention showing a spiral tube adapted to form a circuitous pathway for the spherical switch plunger actuating balls.

Figure 13 is a fragmentary side elevational view of the spiral pathway shown in Figure 12, and illustrating the air control for pressurizing the circuitous pathway to eliminate a considerable amount of friction.

Figure 14 is a horizontal cross-sectional view taken on line 14—14 of Figure 12 and looking in the direction of the arrows to illustrate the manner in which the spiral coil is offset from the automatic control mechanism.

Figure 15 is an enlarged cross-sectional fragmentary view of the upper end of the spiral ball channelway shown in Figure 12 illustrating a removable plug and ball guide.

Figure 16 is a vertical cross-sectional view taken on line 16—16 of Figure 5, and looking in the direction of the arrows and showing a detent clutch for yieldingly holding the drive sprocket and ball propelling wheel in driving relation.

Figure 18 is an enlarged fragmentary top elevational view showing the one-revolution clutch at the end of one revolution during which the two clutch discs are coupled, and with the clutch bolt about to be retracted from the notch of the driving disc in which it is shown to be seated, by the lowered bolt-actuating lever.

Figure 19 is a top elevational view similar to Figure 18 showing the clutch bolt to be fully retracted by the still lowered lever, as results in the clutch bolt and the driven disc being at rest.

Figure 20 is a top elevational view similar to Figures 18 and 19, but showing the actuating lever raised out of the path of the clutch bolt (as in Fig. 17) so that the latter is free to move axially from its illustrated position in which its forward end abuts the face of the driving disc and in which it is ready to drop into the next notch thereof, upon said notch coming into alignment with said bolt, thereby to start a new revolution of the clutch, and Figure 21 is a diagrammatic view showing the manner in which the balls of large diameter may be interspersed with relation to the ones of a small diameter to produce repeated cyclic performance of a machine.

Figure 1:
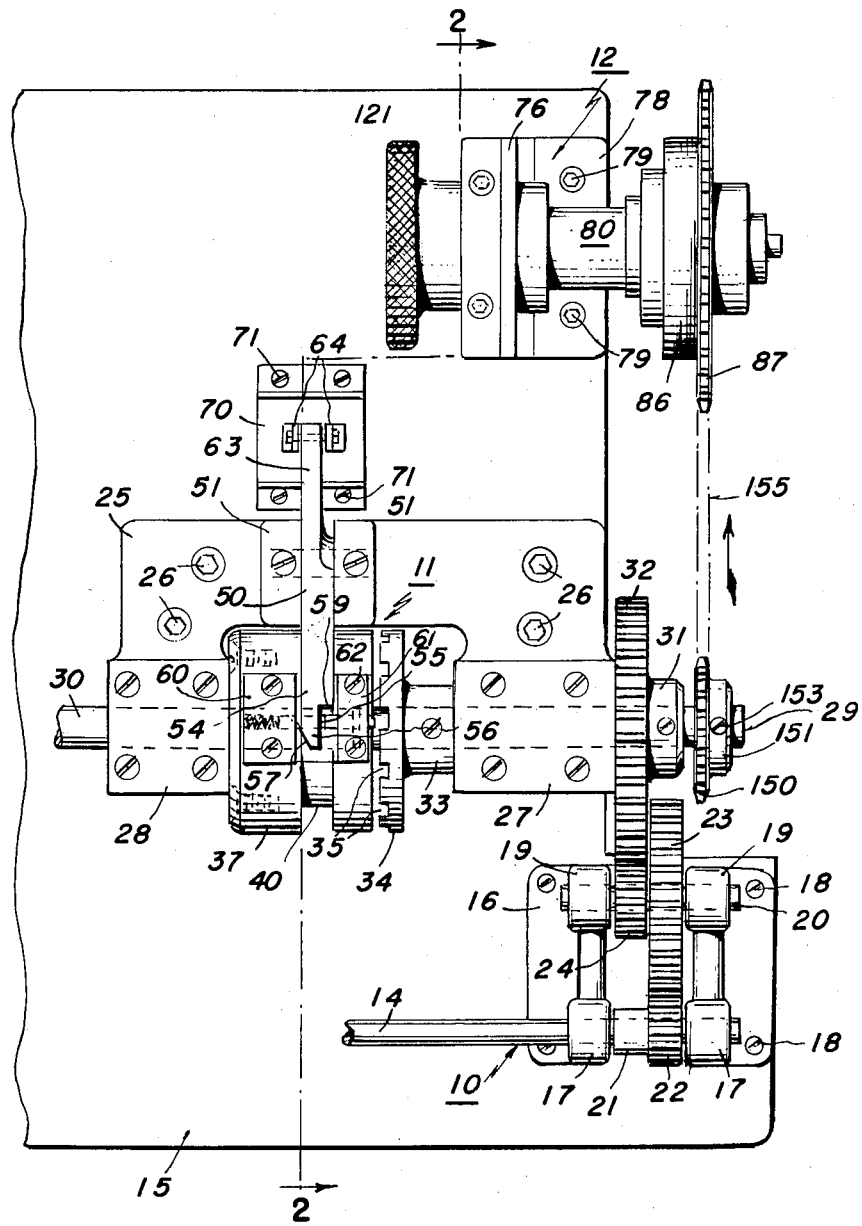
Figure 2:
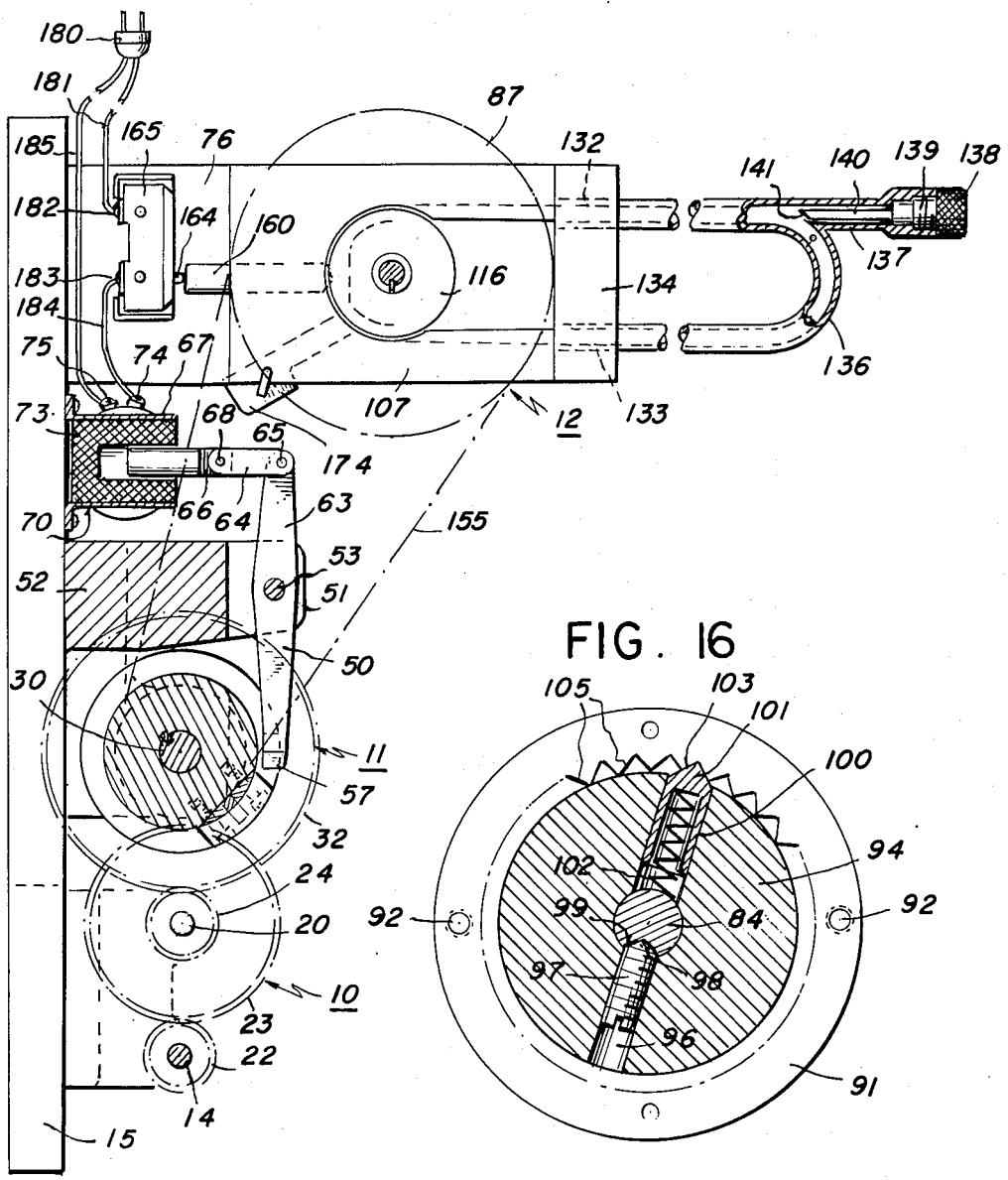
Figure 2 is a vertical cross-sectional view taken on line 2—2 of Figure 1 and looking in the direction of the arrows to illustrate the various parts of the one-revolution clutch and the automatic actuating mechanism therefor.

Referring to the drawings, wherein like reference characters as usual indicate like parts throughout the several views, attention is first directed to Figures 1 and 2 wherein the reference character 10 will generally indicate a drive shaft arrangement which operates continuously and is provided with drive means (not shown) for operating a continuously moving machine part (likewise not shown). The drive mechanism is drivingly connected to a so-called one-way one-revolution clutch generally designated 11 which is adapted to drivingly connect the drive mechanism 10 to an operating shaft performing another operation in the same machine on the same product. It is intended to actuate the one-revolution clutch 11 at predetermined intervals such that a cycle of operations will be repeated in timed relation with the drive mechanism 10. In order to accomplish the proper predetermined sequence of intermittent operation, a control mechanism generally designated 12 is provided and includes driven means coupled with the drive mechanism and adapted to be pre-arranged such that the one-revolution clutch 11 will be actuated in timed relation at properly spaced even or uneven intervals, which will cause the second part of the machine to be operated to produce its repeated cycle of operations as desired.

The drive shaft mechanism 10 includes a drive shaft 14 which is supported on a base 15 by means of a bearing plate 16 having spaced bearing bosses 17. The bearing plate 16 may be affixed to the machine base 15 by screws or the like as at 18. The bearing plate 16 is also provided with a pair of spaced bearing bosses 19 for rotatably supporting a shaft 20 in proper parallel relation with the shaft 14. Keyed to the shaft 14 is the hub 21 of a gear 22 which is arranged in driving relation with a cluster gear having a section 23 of increased diameter and a gear section 24 of reduced diameter. The gears 23—24 are connected to rotate as a unit and reduce the output speed from the shaft 14.

Mounted on the machine frame or base 15 adjacent the drive mechanism 10 is a bearing bracket plate 25 secured in place by Allen screws or the like 26. The bearing plate 25 is provided with a pair of spaced bearing supports 27 and 28 adapted to rotatably support a pair of axially alined shafts 29 and 30. Secured to the shaft 29 adjacent one end is the hub 31 of an enlarged gear 32 which is arranged to be driven by the gear 24 on the shaft 20. It is intended, that the shaft 29 rotate at a speed with relation to the shaft 10 having a ratio of 1 to 12. This is considered proper in certain machines, and especially in the present case where the shaft 14 may be connected to one or more sewing machines and is provided with a suitable drive or power plant such as an electric motor or other source of power.

Figure 17:
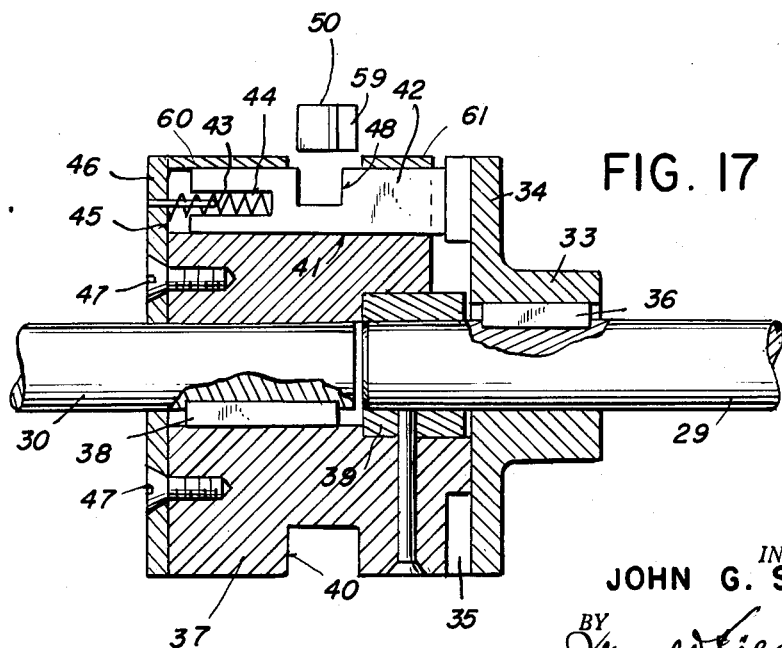
Figure 17 is an enlarged fragmentary cross-sectional view of the one-revolution clutch showing various details of construction and the manner in which the spring loaded bolt is projected into driving engagement with a clutch disc.

The opposite end of the shaft 29 is provided with a collar 33 on which is formed a disc 34 having a series of equidistantly spaced radial notches 35 in one face thereof (Figure 17). The hub or collar 33 of the disc 34 is keyed to the shaft 29 by means of a key 36 which is received in a spline or cut-away portion of the shaft and collar.

The one-revolution clutch 11 also includes a collar 37 keyed to the shaft 30 as at 38. The collar 37 is provided with an enlarged recess at one end for receiving a bearing insert 39 adapted to support the end of the shaft 29, and maintain the shafts 29 and 30 in axial alinement but relatively rotatable. Formed in the peripheral surface of the collar 37 is an annular groove 40 and an axially extending slot 41 which is adapted to slidably receive a sliding clutch bolt 42 having one end presented to the notches 35 in the clutch disc 34 and the opposite end spring loaded by means of a coil spring 43. The coil spring 43 is received in an inwardly extending slot 44 so that one end of the coil spring 43 will abut the end of the slot, and the opposite end will be received on a pin 45 supported on an end plate 46. The end plate is held in place by machine screws or the like 47. Extending radially inward in the clutch bolt 42 is a notch 48 which is adapted to receive a clutch actuator operative to cause the spring loaded bolt 42 to be positively retracted so that it will be held out of engagement with the notches 35 in the continuously rotating clutch disc 34.

A clutch operating lever 50 is provided for controlling the one-revolution clutch, and is pivotally mounted between a pair of arms 51 integrally formed on an upstanding support 52. A pivot pin 53 permits the lever 50 to rock to and fro, and said lever has one of its ends as at 54 provided with a cut-away portion 55 forming a projection 56 having an inclined cam surface 57. The projections 56 is of a width about equal to the slot 48 and the shoulder of the notch 55 as at 59 is adapted to engage a side edge of the clutch bolt 42 and maintain the collar 37 against rotation.

Thus, it will be seen that when the clutch operating lever 50 is rocked on its supporting pin 53, its dog end 56 will be raised from the notch 48 in the clutch bolt 42. This permits the spring 43 to urge the bolt into engagement with one of the notches 35 of the clutch disc 34 which results in the driving of the shaft 30 at the same speed as the shaft 29. The end of the clutch lever 50 normally rides in the peripheral slot 40, and upon one revolution of the collar 37 the cam 57 of the clutch lever engages one side edge of the notch 48 to retract the spring loaded bolt 42. Simultaneously, the shoulder 59 on the end of the clutch lever 50 engages a side wall of the bolt 42 and arrests rotation of the collar 37 and shaft 30. Plates 60 and 61 are secured to the collar 37 on opposite sides of the annular peripheral slot 40, and are secured in place by machine screws 62 to retain the spring loaded bolt 42 in its axial slot 41.

It is intended to automatically control the clutch lever 50 so that its dog end 54 will be moved upwardly and momentarily withdrawn from the annular peripheral slot 40. In order to accomplish this, the opposite end 63 of the lever 50 has pivotally connected thereto, as by means of a pin 65, a pair of links 64. The links 64 are spaced apart and their lower ends are adapted to receive the reduced upper end 66 of a solenoid armature 67. A pin 68 extends through the links 64 and through a corresponding opening in the reduced end 66 of the solenoid armature 67 so as to permit the end of the lever 50 to describe an arc during the actuating motion of the solenoid armature 67. The solenoid armature 67 is a component part of a solenoid 70 which has its base affixed to the base or machine frame 15 by suitable fastening elements 71. The winding 73 of the solenoid 70 is cored for slidably receiving the armature 67 and the ends of the winding 73 are connected to terminal posts 74 and 75.

The automatic control mechanism includes the control device generally designated 12 including an upstanding support 76 (Figs. 3, 4 and 5) which is attached to the machine frame or base 15 by means of an angle bracket 78 secured to the machine frame or base by machine screws 79 (Figure 1). Secured to the plate-like support 76 adjacent its intermediate portion is a bearing housing 80 having a flange 81 which is bolted to the plate-like support by machine screws 82. The bearing housing 80 is provided adjacent each end with ball bearing assemblies 83 for rotatably supporting a shaft 84 which extends through an opening 85 in the plate-like support for a purpose which will be hereinafter more fully described. The opposite end of the shaft 84 has rotatably mounted thereon the hub 86 of a sprocket wheel 87. The bearing 88 of the hub 86 is held in place on the end of the shaft 84 by means of a washer 89 and threaded fastener 90. Secured to the sprocket wheel 87 is a ring 91 which is attached to the sprocket by means of machine screws 92 arranged in circumferentially spaced apart relation with the screw passing through an opening in the sprocket wheel 87 and having its threaded end received in correspondingly threaded openings in the ring 91. A spacing ring 93 may be interposed between the sprocket and ring 91 to offset the ring a slight distance from the sprocket in the direction of the upstanding support 76.

Secured to the shaft 84 is a disc 94 having a groove 95 in one of its radial walls which is concentric with the end of the bearing housing 80, and is adapted to receive the end of said housing for a portion of its length. Formed in the disc 94 is a radial threaded bore 96 for receiving a correspondingly threaded locking screw 97, one end of which is pointed as at 98 for being received in a counterbore 99 in the shaft 84. Also, formed in the disc 94 is a bore 100 in which is slidably mounted a spring loaded plunger 101 adapted to be yieldingly urged outwardly by means of a coil spring 102. The free end of the plunger 101 is pointed as at 103 and is adapted to be received in one of a series of notches 105 formed on the internal peripheral surface of the ring 91. The coil spring 102 has a compression force such that rotation of the sprocket wheel 87 will rotate the shaft 84 when loaded by a freely circulating body of elements but will yield to permit the sprocket to be adjusted relative to the shaft when making certain adjustments.

Figure 3:
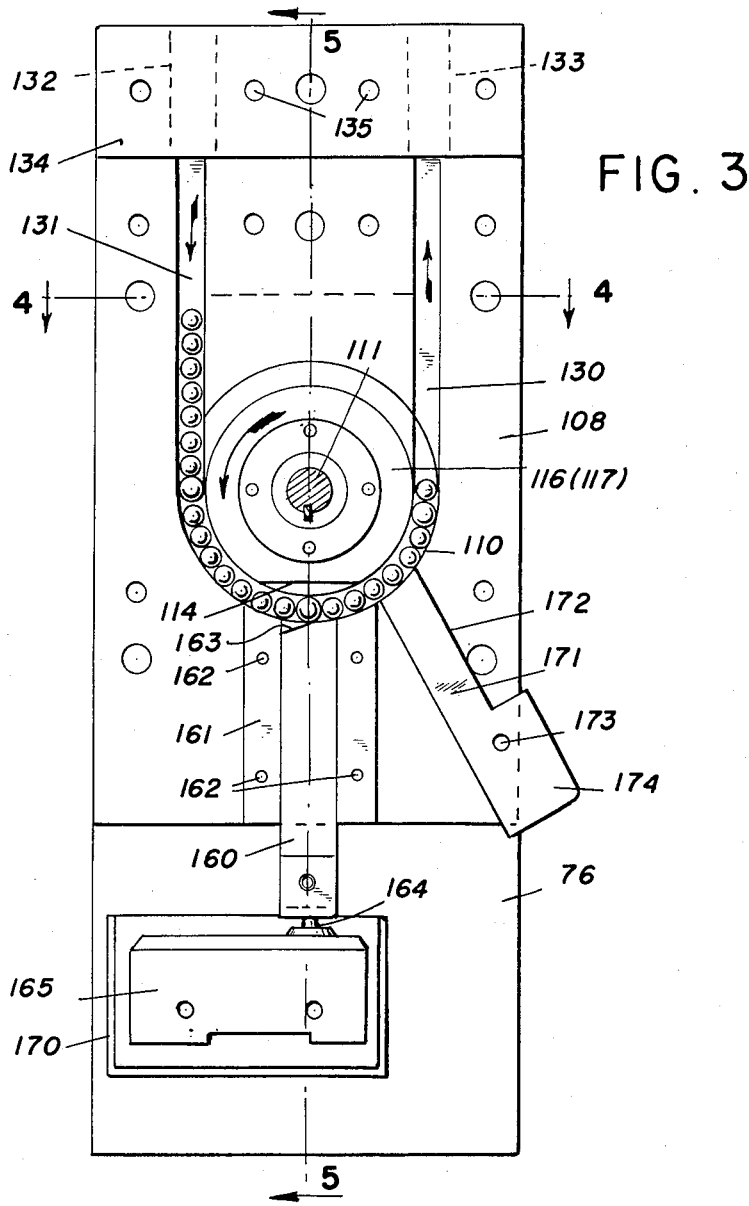
Figure 3 is a front elevational view of the automatic clutch control mechanism showing one of the face plates removed to indicate the manner in which the series of balls are driven continuously along a circuitous pathway with certain balls of a diameter to engage a switch actuating member.
Figure 4:
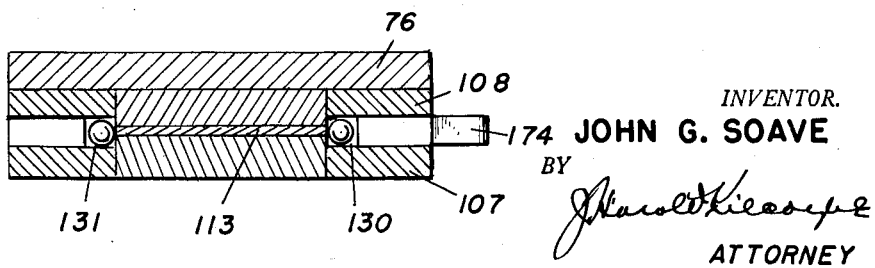
Figure 4 is a horizontal cross-sectional view taken on line 4—4 of Figure 3 and looking in the direction of the arrows to illustrate various structural details of the ball guides and the division plate to prevent the balls from traveling around a circular channel for more than 180 degrees.
Figure 9:
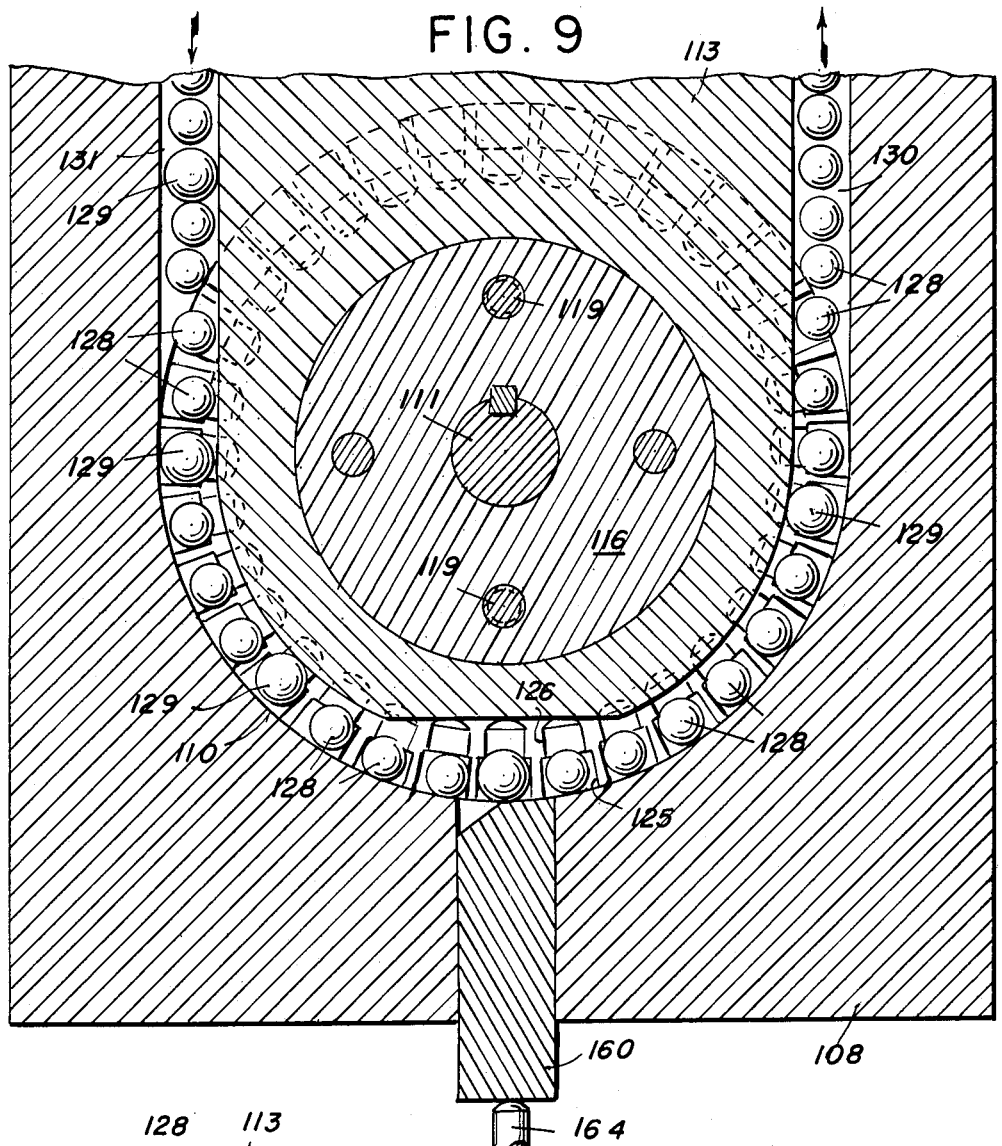
Figure 9 is an enlarged fragmentary cross-sectional view of the ball propelling wheel showing the manner in which the same is employed for propelling the series of balls along a continuous pathway, and showing the manner in which certain balls of increased diameter are adapted to engage a switch actuating plunger.
Figure 10:
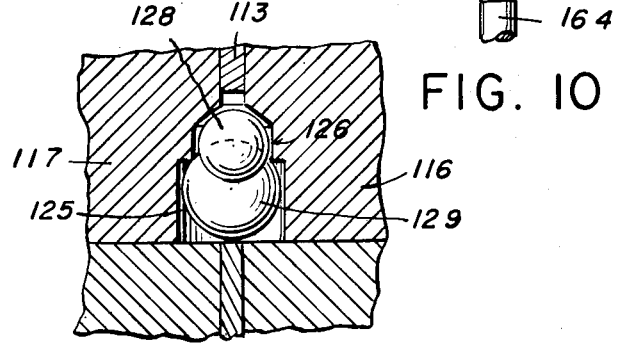
Figure 10 is an enlarged transverse cross-sectional view taken on Figure 9 and showing a fragmentary portion thereof in the area where the propelling wheel and balls are adjacent the switch operating plunger. Thus, it will be seen that the balls of larger diameter engage the switch plunger, while the ones of smaller diameter are received in radial pockets closer to the wheel axis.
Figure 11:
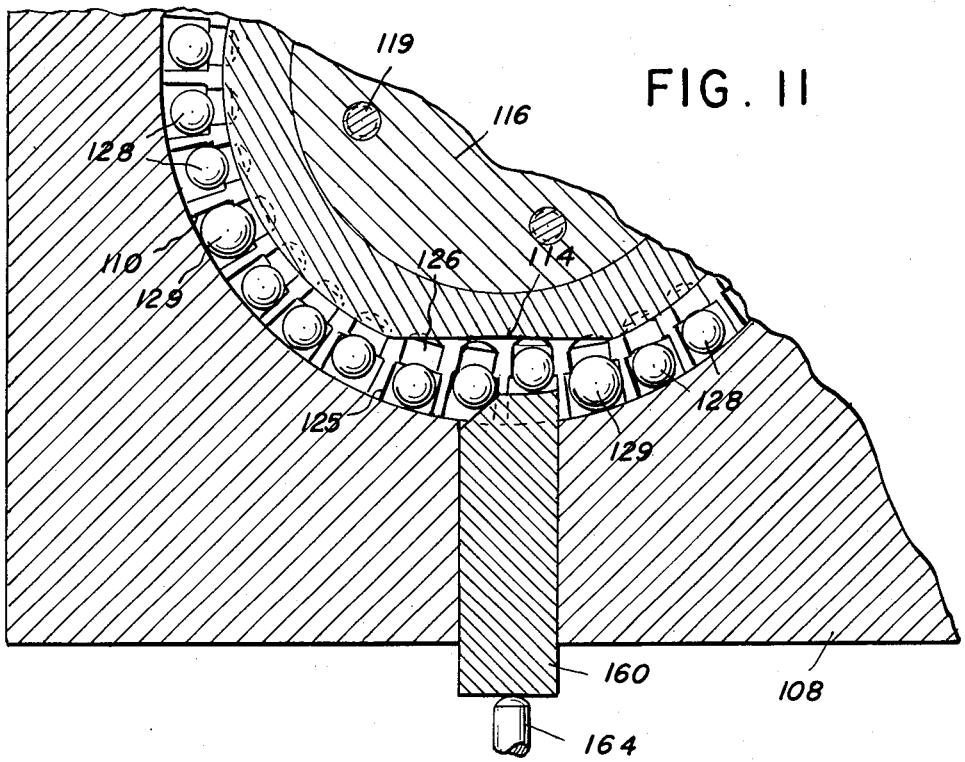
Figure 11 is an enlarged fragmentary cross-sectional view similar to Figure 9, but showing the manner in which the balls of smaller diameter by-pass the switch actuating plunger without depressing the same.

Mounted on the upstanding plate 76 is a pair of control mechanism plates 107 and 108 having hub openings 109 and 110 through which the reduced end 111 of the shaft 84 projects. The plates 107 and 108 are secured together by machine screws 112, and clamped between the plates 107 and 108 is a partition 113, the lower end of which is cut as shown at 114 (Figure 3). The partition is provided with a central opening 115 for accommodating a ball circulating wheel composed of circumferentially divided sections 116 and 117. The sections are annularly scarfed as at 118 and secured together by pins or the like 119.

The circulating wheel discs 116 and 117 are of a diameter to be received within the openings 109 and 110 in the plates 107 and 108, and the disc 116 of the circulating wheel is keyed to the shaft 84 as at 120, and since the discs 116 and 117 are connected by pins 119 said discs turn with the shaft as a unit. A knurled hand wheel 121 is likewise keyed to the reduced end 111 of the shaft 84 by means of a key 122 and the extreme free end of the shaft is threaded as at 123 for receiving a retaining washer and nut 124. Thus, rotation of the hand wheel 121 may permit the shaft 84 to be rotated to position the circulating wheel discs 116 and 117 in any desired angular position with respect to the shaft 84.

Formed in adjacent radial surfaces of the circulating wheel discs 109 and 110 are notches 125 and 126 which are mutually arranged to form ball receiving pockets of two diameters. The diameters of the ball receiving pockets formed by the complementary notches 126 in the circulating wheel discs 116 and 117 are such as to receive circulating balls 128 (Figs. 3, 9, 10 and 11). While the diameters of the ball receiving pockets formed by the notches 125 in the circulating wheel discs 116 and 117 are of a diameter to receive balls 129 of slightly increased diameter. The notches 125 and 126 are formed in circumferentially, equidistantly spaced apart relation. The partition 113 prevents the balls from passing around the wheel between a pair of channelways formed by mutually opposed grooves 130 and 131 in the plates 107 and 108. The channelways thus formed by the opposed grooves 130 and 131 extend to the upper end of the plates 107—108 where they communicate with passageways 133 and 132 in a block 134. The block 134 is secured to the extreme upper end of the upright supporting plate 76 by suitable fasteners passing through openings 135 which are adapted to accommodate bolts and nuts similar to the bolts 112 which secure the plates 107 and 108 together.

A closed loop tube 136 (Figure 2) has its ends received in the bores 132 and 133 of the block 134, and an extension 137 is formed adjacent the bend of the closed loop tube for permitting the insertion of balls 128 and 129 in their proper order to produce a certain predetermined repeated cycle of operations. A closure plug 138 is externally threaded as at 139 for being received in a correspondingly threaded portion in the upper end of the filler tube 137. Formed integral with the closure plug 138 is a rod 140 which has its lower end curved as at 141 to form a continuation of the loop tube wall 136 and thereby prevent balls from being forced upwardly into the filler tube 137.

It is intended to circulate a series of balls 128 and 129 through the circuitous pathway formed by the channelways 130—131 and the loop tube 136, when said channelways and tube are filled with the balls in a predetermined order to produce a desired machine performance. In order to circulate the balls at a speed proportionate to the speed of the shaft 29, a sprocket wheel 150 has its hub 151 secured to the shaft 29 by means of a locking screw 153. The sprocket wheel 150 is alined with the sprocket wheel 87, and a sprocket chain 155 is trained over the sprocket wheel 150 and arranged in driving engagement with the sprocket wheel 87. Thus, it will be seen that the column of balls in the channelways 130—131 and loop tube 136 will be circulated through the circuitous pathway at substantially the same speed as the shaft 29.

The circulating series of balls moving about said circuitous pathway provides an actuating means which can be changed as desired by re-arranging the balls in accordance with the number of sequential cyclic operations desired. This is accomplished by a reciprocating actuating member 160 which is slidably mounted between the plates 107 and 108 and is prevented from being displaced by means of strips 161 secured between the plates and held in place by fastener elements 162. The upper end of the actuator plunger 160 is inclined as at 163 in an upward direction (Figure 3), and said inclined end 163 is presented to the circulating balls 128 and 129 as they pass around the lower portion of their circuitous pathway. The lower end of the actuating plunger 150 is arranged in abutting relation with the plunger 164 of a microswitch 165 secured to the upright 76 by means of bolts 166 held in place by nuts 167. The microswitch 165 is partially enclosed in a casing 170 which is likewise held in place by the bolts 166.

When it is desired to change the arrangement and order of the small and large balls 128 and 129, a strip 171 is removed from a groove formed in the adjacent surfaces of the plates 107 and 108. The grooves indicated at 172 (Figure 3) are the same, and are formed as complements. The groove thus formed provides a passageway extending into the opening 109—110 of the plates 107—108 so that the balls can be removed when desired. The strip 171 forms a plug which is held in place by means of a movable pin 173. The lower end 174 of the plug extends beyond the edge of the plates 107—108 to facilitate easy removal from the discharge passage or groove 172.

The actuator plunger 160 could be directly connected to the clutch actuating lever 50 to rock the same at predetermined intervals and thus cause the shaft 30 to be rotated at certain intervals to produce a desired machine performance with a repeated number of sequential operations. However, in order to adapt the automatic control mechanism to control a number of different machines if desired, the actuating plunger 160 is adapted to engage the micro-switch plunger 164 each time a ball 129 of large diameter moves above and across the inclined surface 163. As the actuating lever 160 engages the plunger 164 it depresses the same and closes a circuit through the winding 73 of the solenoid 70. An electrical plug 180 has one of its cables 181 connected to one of the terminals 182 of the micro-switch 165. The other terminal 183 of the micro-switch 165 is connected to the terminal post 74 of the solenoid 70. The other terminal post 75 is connected by a cable 185 to the other terminal of the two-part slug 180. By electrically connecting the plug 180 to a source of electrical energy, the clutch bolt actuating lever 50 will be operated each time one of the large balls 129 in the circuitous pathway engages the upper end of the reciprocating actuating member 160. The clutch actuating lever 50 is normally in the position shown in Figures 1 and 2 such that the end 56 is received in the annular groove 40 in such a manner as to hold the clutch bolt 42 in a retracted position with the end thereof out of engagement with the notches 35 in the disc 34.

When one of the large balls 129 causes the microswitch to be actuated and the solenoid 70 energized, the end 56 of the clutch actuating lever 50 is moved upwardly out of engagement with the clutch bolt 42. The moment this occurs the bolt is projected into engagement with one of the notches 35 in the radial wall of the disc 34 such that the shaft 29 is drivingly engaged with the shaft 30. The shaft 29 is rotated at a speed with relation to the shaft 14 of approximately 1 to 12 so that the shaft 14 will make 12 revolutions to 1 revolution of the shaft 29. When the shafts 29 and 30 are drivingly connected by the one-revolution clutch 11, the shaft 30 will be rotated at the same speed as the shaft 29 for 1 revolution. Just before the end of the revolution of the shaft 30 and the one-revolution clutch 11, the clutch actuating lever 50 will be in a position (Figure 18) with its end 56 in the annular groove 40 to engage one of the walls of the notch 48 in the spring loaded clutch bolt 42. The inclined surface 57 will be presented to the approaching correspondingly shaped edge of the notch 48 so that upon engagement as shown in Figure 20, the inclined portion 56 will engage the clutch bolt 42 and retract the end from engagement with one of the notches 35 in the disc 34. Continued movement of the clutch in the direction of the arrows shown in Figures 18, 19 and 20 will cause the inclined portion 57 of the clutch actuating lever 50 to fully retract the clutch bolt 42 and will present the shoulder 59 of the actuating lever to one side of the clutch bolt 42 and thereby arrest rotation of the clutch collar 37, and likewise rotation of the shaft 30 until a predetermined number of balls have passed above the actuating plunger 160 and another large ball 129 has caused the actuating plunger 160 to be again operated.

In the modified form of the invention shown in Figures 6, 7 and 8 the ball circulating mechanism is the same as before and is supported on the upright 76 with the shaft for circulating the balls rotatably mounted in the vertical plate-like support 76, so that the balls will be circulated through the channels 130 and 131. The ball channelway shown in the form of the invention illustrated in Figures 1 to 5, 9 to 11 and 16 to 21 inclusive can be removed and replaced by the type of spiral ball channel shown in Figures 6 to 8 inclusive.

The ball channel in Figures 6 to 8 inclusive includes a cylindrical housing 190 in which a cylinder 191 is mounted and supported by means of a bracket 192 which has one end affixed to the upright 76 by machine screws 193, and the angular portion 194 is attached to a plug 195 in the cylinder 191 by means of a machine screw 196. The peripheral surface of the cylinder 191 is provided with a spiral groove 197 providing a channelway which is closed by the cylinder 190. A tube 198 is attached to the cylinder 190 and has its lower end projecting as at 199 for reception in the removable coupling block 200, which is substantially the same as the coupling block 134 and has its ports communicating with the channels 130 and 131. The upper end of the tube 198 is secured in place by means of a clip 201 and has its end terminating adjacent the uppermost convolution of the spiral passage 197. An opening in the cylinder 190 permits the open upper end of the tube 198 to communicate with the uppermost convolution of the spiral groove 197. A plug 202 is mounted in the upper end of the cylinder 191 and is fastened in place by suitable means (not shown). A plate 203 is affixed to the plug 202 by threaded fasteners 204 and said plate is provided with a filler member 205 having an internal passageway 206 communicating with a passage 207 leading to the uppermost convolution of the spiral passage 197.

The lower end of the cylinder 190 has attached thereto the discharge end of the spiral passageway pipe 208, which pipe has its open end communicating with a passage through the cylinder 190 and in direct communication with the lower convolution of the spiral passageway 197. The pipe 208 is held in place by a clip 209 secured in position by threaded fasteners or the like, and the opposite end of the pipe 208 is received in the coupling block 200. It is intended to employ a spiral channel for the circulating balls when a large number of cycles of operation are to be performed on a machine in which all of the cycles are of different duration or spaced various distances and intervals.

In the modified form of the invention shown in Figures 12 to 15 inclusive, there is shown a spiral channel member for the circuitous passage of the control balls. In this form the control mechanism including the ball circulating wheel and plates 107 and 108 are the same as before, and the modification includes a coupling block 210 which as before, is similar to the coupling block 134 and is removably held in place in substantially the same manner as described previously. The passages 211 and 212 communicate with the ball channels 130 and 131 shown in the form of the invention described in connection with Figures 1 to 11 inclusive.

As shown in Figure 12, the coupling block 210 is secured in place upon the upper ends of the blocks 107 and 108 in such a manner as to provide an air-tight joint therebetween, and mounted in the opening 210 is the vertical leg 213 of a ball channelway which is return bent at the upper end as at 214 and has its end portion 215 spirally curved to provide a series of spiral convolutions 216. The lower end of the spiral passageway 216 terminates in a straight portion 217 which is received in the opening 212 in the coupling block 210.

In order to reduce friction to a minimum and permit the balls to circulate through the spiral convolutions 216, pressure fluid is injected into the spiral convolutions by means of a fitting 218 secured to the return bent portion 214 of the channel member 213. The fitting is provided with a passageway 219 which communicates with the convolutions 216 through an opening 220 and also with a passage 221 communicating with the passageway 219. A pressure fluid supply pipe 222 has its coupling nipple 223 externally threaded as at 224 for being received in a correspondingly threaded enlarged opening of the passage 221 as at 225.

A closure plug 226 is provided for the passageway 219 and has a knurled thumbpiece 227 on the upper end thereof. The lower end is reduced as at 228 and has its end terminating in a curved portion 229 adapted to conform to the curvature of the return bent channelway 214 and thereby prevent balls from being forced upwardly into the passage 219.

As best seen in Figs. 13 and 15, a pin 230 having a knurled head 231 is threadedly carried in an offset 232 having a small diameter opening 233 communicating with the bore of the return bend portion 214 of the ball channelway. Said pin 230 may be turned so as to project into said bore, thereby to block movement of the balls thereinto, under conditions requiring same.

It will be seen that pressure fluid to the upper end of the ball channelway and tangential to the return bend 214 will produce an impelling force which will propel the balls in the spiral channel portion 216 downwardly in addition to the movement imparted to the balls by the continuously rotating ball circulating wheel comprising the parts 116 and 117 and employed in the other forms of the invention.

For an understanding of its operation, attention is directed to Figures 1 and 2, wherein there is illustrated a complete assembly of the automatic control mechanism of the invention. It will be assumed that the shaft 14 is connected to a machine such as a sewing machine or the like, to drive same throughout repeated cycles, and that said shaft is also driven by a suitable source of power and at a speed conventional in machines of this type. Also, let it be supposed that the shaft 30 is connected to drive mechanism adapted to perform an operation on the same article being stitched in the sewing machine, and that it is desired to operate the shaft 30 at repeated intervals within each cycle of operation of the sewing machine, so as to perform the additional operation upon the article (such as the attaching of fasteners of the hook and eye and snap type), while the article is being continuously stitched. In order to accomplish the above, it is necessary to controllably operate the shaft 30 from the shaft 14 at the desired intervals, and hence the shaft 14 is geared to the shaft 29 by a reduction gearing such that the shaft 29 will rotate once to 12 revolutions of the shaft 14. Obviously, the shaft 30 will also rotate at the proportionate speed ratio when the one-revolution clutch 11 is operated.

Thus, it will be seen that each time the clutch 11 is actuated to cause the clutch bolt to engage the disc 34, the shaft 30 will rotate one revolution to 12 revolutions of the shaft 14. Of course, this ratio could be changed but it has been found the most convenient for various operations in machines of this type.

The automatic control mechanism for operating the clutch at predetermined intervals to cause repeated cycles of machine performance has been described, and as pointed out, the one-revolution clutch is controlled by the large and small balls 128 and 129 which are moved along a circuitous pathway so that the larger balls 129 will engage the upper end of the actuating plunger 160 and produce an impulse which will operate the plunger of a mirco-switch and thence through the solenoid 70 to actuate the clutch 11.

The invention makes possible various arrangements of the balls 128 and 129 so as to produce any required machine performance; that is to say, the large balls 129 may be spaced as required by the inter-position of the balls 128 in the circuitous ball pathway, provided the spacing is such that the larger balls operate the one-revolution clutch at least once while the machine shaft 14 is rotated 12 times. As an illustration, attention is directed to Figure 21 which diagrammatically shows one complete cycle of machine operations and the arrangement of the balls to produce repeated machine performance within said cycle. In said figure, the right side represents the ratio of turns of shaft 14 to turns of shaft 30 within one complete cycle of machine operation, while the left side diagrammatically shows the arrangement of the large and small balls for accomplishing same.

Of course, since the ratio of the shafts 14 and 30 is initially 12 to 1 (as fixed by the interposed gear train), this ratio has to be considered in determining the spacing of the balls 129. Figure 21 illustrates 59 balls, including 3 large balls 129 (indicating three engagements of clutch per complete cycle) in the circuitous pathway, with the spacing of said large balls by the balls 128 being such as to produce machine performance through the shaft 30, as determined by one revolution of said shaft per 14, 20 and 25 revolutions, respectively, of the shaft 14 (turning continuously throughout the cycle) within each cycle of machine operation. To the right of the ball series there is indicated the number of small balls 128 in excess of twelve which must be interposed between the large balls 129 to achieve the aforesaid shaft revolution pattern.

In explanation, it will be assumed that the cycle has been started by the lowest large ball 129 (shown in dotted lines) having moved above the actuating plunger 160 to cause the one-revolution clutch to be engaged by lifting the lever 50 out of engagement with the clutch bolt 42. This results in the shaft 14 rotating 12 times during one revolution of the shaft 30, whereupon the clutch disengages, and it also brings the thirteenth small ball (counting from the lowermost small ball) and finally the first (lowermost full line) large ball 129 above the plunger 160 which in effect delays engagement of the clutch until the shaft 14 has completed its thirteenth and fourteenth revolutions.

Upon the fourteenth ball, i. e. the lowermost full line large ball 129 engaging the actuating plunger 160, the clutch actuating lever 50 will be raised out of the path of the clutch bolt so as to again drivingly connect the shafts 14 and 30. Consequent to this second clutch engagement, shaft 14 is rotated 12 times during one revolution of the shaft 30, whereupon the clutch disengages to interrupt motion of the shaft 30 until seven additional small balls 128 and the next highest large ball 129 (making up the difference between 20 and 12 revolutions) are circulated to the plunger 160, such meaning that the shaft 14 has now completed its required 20 revolutions per one revolution of the shaft 30.

Upon said next highest large ball 129 engaging the plunger 160, the clutch is again engaged. As before, clutch engagement results in the shaft 14 rotating 12 times during the one revolution of the shaft 30, and upon such one revolution having terminated, maintains said shaft 30 against movement until the next 12 small balls 128 and the topmost large ball 129 have circulated to the plunger 160, thus making the required total of 25 revolutions of shaft 14 during the final one revolution (within the cycle) of the shaft 30. Completion of the cycle also brings the uppermost large ball 129 into the position of the lowermost dotted line ball shown in this figure, whereupon to condition the mechanism for a repeat cycle.

On the understanding that the number and arrangement of balls as shown in Figure 21 is illustrative only, it will be appreciated that the balls may be arranged in any sequence required to produce a desired number of clutch engagements within a complete cycle (as is physically possible within the cycle); that the clutch engagements may be arranged to take place at equal and/or unequal intervals; and that the ratio of interdependently operated shafts is accordingly not limited to any fixed numeral value, but, instead, may be stretched out as desired, to meet the demands of a particular operation in simple and effective manner.

Frequently, it will be necessary to employ a large number of small balls 128 with the large balls 129 dispersed throughout the line to produce various machine performance. When this is required, the path of the loop tube 136 can be increased by substituting the spiral pathway shown in either Figures 6, 7 and 8, or 12, 13, 14 and 15.

When changing the arrangement of the large balls 129 in the circuitous pathway, it will be required that all of the balls be removed by displacing the plug 171 and permitting the same to be discharged through the port passage 172. Since the last large ball to actuate the clutch is also the first in the next cycle of operations, the balls may be distributed throughout the circuitous pathway without requiring unnecessary skill on the part of the operator in re-arranging the apparatus for different repeated cycles of machine operation.

When setting up the automatic control mechanism, it may be necessary to rotate the wheel 116—117 to a proper position so that the large balls will engage the inclined upper end of the actuating plunger 160 at the proper interval. This is accomplished by manipulating the hand wheel 121 which permits the shaft 84 and the ball propelling wheel 116—117 to be angularly displaced such that the large balls will be properly located for each sequence and repeated cycles of operation.

By employing spiral pathways on the downward side of the ball column, the load on the impeller wheel 116—117 is decreased since the weight of the majority of the balls is in a direction toward the direction of rotation of the ball impeller wheel 116—117.

As many changes could be made in carrying out the above constructions without departing from the scope of the invention, it is intended that all matter contained in the above description or shown in the accompanying drawings shall be interpreted as illustrative and not in a limiting sense.

I claim:

1. Automatic control mechanism for performing a number of operations at repeated intervals within a selected number of revolutions of a driven shaft, comprising in combination clutch means for connecting the driven shaft to a machine part to be operated, a circuitous pathway, a series of freely rolling balls of different diameter movable along said pathway, a lever mechanism actuated in spaced intervals by the balls of larger diameter to actuate said clutch to cause the driven shaft to drive said machine part, and means for circulating said balls in said circuitous pathway.

2. Automatic control mechanism for machines with interdependently operating parts, comprising in combination a clutch adapted to inter-connect said parts, a circuitous pathway, a series of freely rolling balls of different diameter movable along said pathway, a lever mechanism for controlling said clutch when one of said balls of a larger diameter reaches a predetermined location in said pathway, means operable by said lever for controlling said clutch at repeated intervals, and means for circulating said balls in said circuitous pathway.

3. Automatic control mechanism for performing repeat operations of a machine part at intervals within a cycle, comprising in combination a continuously operating drive shaft drivingly connected to a driven shaft, speed reduction gearing for connecting said shafts whereby the driven shaft will be rotated one revolution to a number of revolutions of the drive shaft, a clutch adapted to connect the driven shaft to a machine for performing said repeat operations, a circuitous pathway, a series of freely rolling balls of different diameter movable along said pathway, means driven by said drive shaft for moving said balls along said circuitous pathway, a lever adapted to be actuated when one of the balls of larger diameter moves to a predetermined point in said circuitous pathway, a clutch bolt carried by the clutch adapted to be normally held retracted by said lever, and projected upon operation of said lever to connect said driven shaft to said machine part, said clutch including a clutch disc on the driven shaft, and spring means for projecting the clutch bolt into a notch in the clutch disc when the lever is moved out of engagement with the clutch bolt.

4. Variable automatic control mechanism for performing a number of operations at repeated intervals within a preselected number of revolutions of a driven shaft, comprising in combination, a drive shaft, reduction gearing connecting the drive shaft to the driven shaft, a clutch adapted to be connected to the driven shaft at intervals to perform the repeat operation of said machine, a circuitous pathway, a series of freely rolling balls movable along said pathway including enlarged balls at spaced preselected intervals, a clutch actuating lever associated with said clutch and arranged to be actuated when the enlarged balls reach a predetermined location along said circuitous pathway, a clutch bolt normally held retracted by said clutch lever and yielding spring means for urging said bolt into a clutching position when said lever is actuated.

5. Variable automatic control mechanism for performing a number of machine operations at irregular intervals comprising in combination, a driving shaft, a clutch connected with said driving shaft and adapted to be coupled to a shaft of a machine to be controlled, a circuitous pathway, an endless series of freely rolling balls movable along said pathway with certain of said balls being of increased diameter to provide inter-changeable control means, an actuating member extending into said circuitous pathway adapted to be engaged by the balls of larger diameter at spaced intervals, a circuit having a source of electrical energy, a micro-switch in said circuit adapted to be operated by said actuating member, a solenoid in said circuit adapted to be energized when said micro-switch is closed, means actuated by said solenoid for causing said clutch to engage and produce rotation of the shaft of said machine to be controlled, and means for circulating said string of balls around said circuitous pathway.

6. Variable automatic control mechanism for performing repeat operations of a machine part at irregular intervals within a cycle, comprising in combination a continuously operated drive shaft connected to the machine to be controlled for performing one operation, a driven shaft adapted to be connected to another operating part of the same machine to be controlled, a clutch for drivingly connecting said drive shaft to said driven shaft, a circuitous pathway, a series of balls of different diameter movable along said pathway, means driven by said drive shaft for continuously moving said balls along said pathway, a plunger extending into said pathway adapted to be operated at pre-selected intervals by said balls of larger diameter, a circuit having an electrical source of energy, a switch in said circuit adapted to be operated by said plunger, a solenoid in said circuit, a clutch lever adapted to be operated by said solenoid when one of the large balls engages said plunger, and means on said clutch operated by said lever to drivingly connect the drive shaft to said driven shaft to perform one of said repeat operations of said machine part.

7. Variable automatic control mechanism for performing a number of repeat operations of a machine part at intervals within a cycle, comprising in combination a drive shaft adapted to be coupled to a driven shaft, clutch means for connecting said drive shaft to said driven shaft, a clutch operating lever for controlling said clutch means, a circuitous pathway having a series of balls of large and small diameter with the balls of large diameter spaced in accordance with the sequence of machine performance, means for moving said balls along said pathway adapted to be driven by said drive shaft, said means including a rotating drum having a series of pockets in its periphery to receive the balls of large and small diameter and having depth such that the balls of small diameter will be moved slightly inward away from said pathway in a lateral direction, while the ones of large diameter will be maintained in said circuitous pathway, said drum being formed of circumferentially divided sections with a partition extending therebetween to maintain the balls in said circuitous pathway and to remove them from the pockets, a plunger extendind into said pathway adapted to be engaged by the balls of larger diameter and means controlled by said plunger for operating said clutch lever whereby said machine part will be operated to perform one of said machine operations in said cycle, responsively to each engagement of a larger ball with said plunger.

8. A mechanism as set forth in claim 7, in which the circuitous pathway includes a closed guideway.

9. A mechanism as set forth in claim 7, wherein said circuitous pathway is formed as a closed elongated loop.

10. A mechanism as set forth in claim 7, in which the circuitous pathway has a portion thereof spirally formed to increase the length of said circuitous pathway when machine performance requires a large number of different sequential operations within a cycle.

11. A mechanism as set forth in claim 7, in which the drum for rotating the balls is provided with a hand wheel to permit the drum to be re-positioned when machine adjustments are required.

12. A mechanism as set forth in claim 7, in which the means for moving the balls including said drum is mounted on a shaft provided with a spring loaded coupling to allow rotative adjustment of said shaft independently of said driving means.

13. Variable automatic control mechanism for performing a given number of operations of a machine part at intervals within a cycle, comprising in combination a driving shaft, a clutch connected with said driving shaft and arranged for driving said machine part, an auxiliary shaft driven from said clutch, a circuitous pathway, a series of balls of large and small diameter freely movable along said pathway, a drum on said auxiliary shaft having a series of ball pockets of different diameter in its peripheral surface so that the correspondingly sized balls in said pathway will be received in the large and small pockets, spring loaded coupling means between said auxiliary shaft and said drive shaft, a ring provided with internal teeth on said shaft, a spring loaded coupling pin keyed to said shaft and adapted to engage the internal teeth on said ring to permit said shaft to be adjusted relative to the driving shaft, a plunger extending into said pathway adapted to be engaged by the balls of large diameter at intervals and to be unaffected by the balls of smaller diameter, lever mechanism controlled by said plunger, and a spring loaded bolt on said clutch normally held in a de-clutched position by said lever mechanism until said lever mechanism is actuated by one of said large balls engaging said plunger.

References Cited in the file of this patent

UNITED STATES PATENTS

| | | |
|---|---|---|
| 1,620,638 | Faller | Mar. 15, 1927 |
| 1,872,132 | Falleson | Aug. 16, 1932 |
| 1,932,914 | Shelton | Oct. 31, 1933 |
| 2,004,794 | Munschauer | June 11, 1935 |
| 2,275,436 | Holcomb, Jr. | Mar. 10, 1942 |
| 2,343,297 | Holcomb Jr. | Mar. 7, 1944 |

FOREIGN PATENTS

| | | |
|---|---|---|
| 360,602 | Germany | Oct. 5, 1922 |
| 546,902 | Great Britain | Aug. 5, 1942 |